United States Patent [19]

Gerdau

[11] Patent Number: 4,668,252
[45] Date of Patent: May 26, 1987

[54] DEGASIFIER FOR A LIQUID SEPARATED FROM A GASEOUS FLUID BY A SEPARATOR

[75] Inventor: Alfred Gerdau, Munich, Fed. Rep. of Germany

[73] Assignee: Rotorcomp Verdichter GmbH, Munich, Fed. Rep. of Germany

[21] Appl. No.: 744,261

[22] Filed: Jun. 13, 1985

[30] Foreign Application Priority Data

Dec. 11, 1984 [DE] Fed. Rep. of Germany ....... 3445052

[51] Int. Cl.$^4$ ............................................. B01D 45/00
[52] U.S. Cl. ....................... 55/191; 55/320; 55/337; 55/338; 55/465; 184/6.16; 415/168; 415/126 A
[58] Field of Search ............................ 55/97, 183–185, 55/189–195, 204, 320, 321, 325, 326, 337, 338, 462, 465, 459 R, 473; 62/468–470; 184/6.16; 415/168, 121 A

[56] References Cited

U.S. PATENT DOCUMENTS 3,616,599 11/1971 Burnham, Sr. ....................... 55/193
3,788,040 1/1974 Bragg et al. ........................... 55/204

FOREIGN PATENT DOCUMENTS 1055532 11/1983 U.S.S.R. ................................ 55/189

*Primary Examiner*—Bernard Nozick
*Attorney, Agent, or Firm*—Hauke & Patalidis

[57] ABSTRACT

The invention is addressed to a degasifier for a liquid separated from a gaseous fluid in a gas/liquid separator, such as a degasifier for removing air in suspension in oil after separating the oil entrained in the compressed air, the oil separated from the compressed air being returned to the air compressor. The oil separated from the compressed air in the gas/liquid separator collects in a sump at the bottom of the separator housing. A vessel is disposed in the sump below the level of the oil in the sump. The vessel is open at its bottom and closed at its top, and is partially filled with the oil in the process of being degasified. The top of the vessel is connected by a conduit to a source of reduced pressure, for example a venturi tube disposed in the inlet to the gas fluid separator. The gas collecting below the top of the vessel, air in the example of application described, is continuously evacuated through the conduit and reinserted into the compressed air flow into the separator. By removing the air in suspension in the oil prior to feeding the oil back to the air compressor, the degasified oil lubricating, cooling, and noise insulation qualities are improved.

12 Claims, 6 Drawing Figures

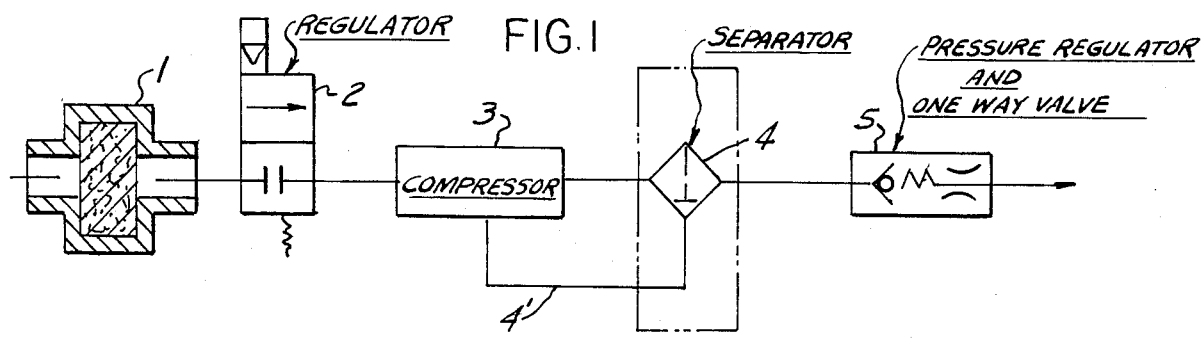
FIG. 1
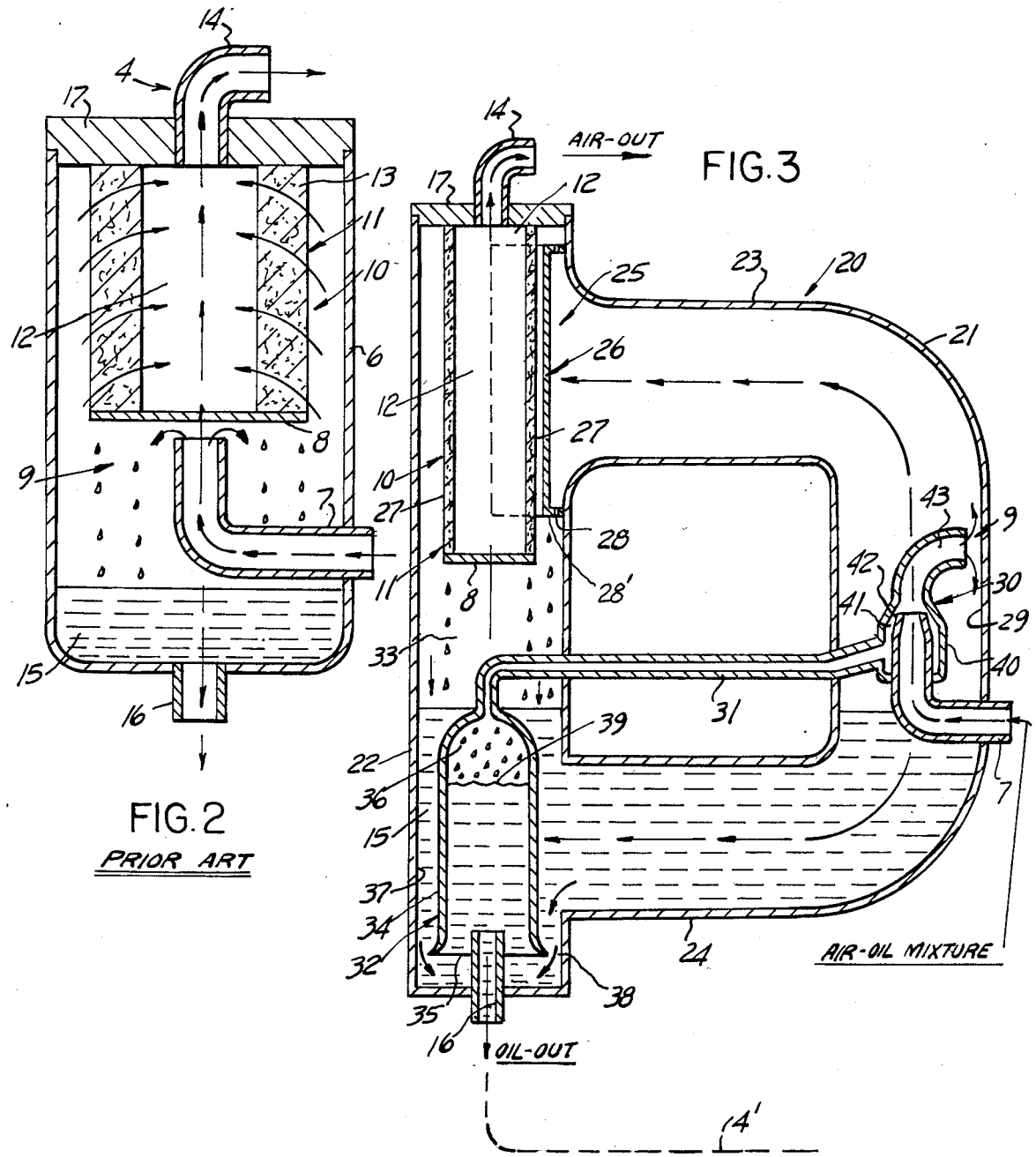
FIG. 2 PRIOR ART
FIG. 3

DEGASIFIER FOR A LIQUID SEPARATED FROM A GASEOUS FLUID BY A SEPARATOR

CROSS-REFERENCE TO RELATED APPLICATION

The present application is related to application Ser. No. 774,262, filed contemporaneously with the present application, and assigned to the same assignee as this application.

BACKGROUND OF THE INVENTION

The present invention relates to a degasifier for a liquid separated from a gaseous fluid in a gas/liquid separator in general, and more particularly for a degasifier forming part of a gseous fluid compressor system, for example for compressing atmospheric air.

In conventional systems for compressing a gaseous fluid, a liquid, such as oil, is used for cooling, lubricating and sealing the compressor, as for example a screw compressor, and is added to the gaseous fluid during compression of the gaseous fluid in the compressor portion of the system. The oil must be removed in a separating unit, prior to the gaseous fluid being delivered to the consumer. The separated liquid is returned to the compressor forming a part of the system, generally after having been passed through a cooler. The apparatus separating the liquid from the gaseous fluid is a gas/liquid separator, more particularly an oil-air separator in the specific example of a compressor system for air. The separator usually comprises a coarse separation section and a fine purification section. Both are installed in a vessel-like housing which is preferably of circular cylindrical shape. The gaseous fluid stream which enters the separator and which is to be processed consists of a mixture of liquid and gas, for example of a mixture of oil and air. The mixture is supplied to the inlet of the separator housing from the compressor outlet and is delivered, in the separator, against a baffle which constitutes the coarse separation section of the separator. The bottom portion of the housing forms a liquid collecting sump, i.e. an oil collecting sump, in which accumulates the oil separated from the gaseous fluid in the coarse separation section and in the fine purification section disposed downstream. The oil separated from the compressed air in the separator still contains air, in the form of bubbles. The oil, recovered in the separator, is returned to the compressor, and therefore, if it is desired to degasify the oil prior to returning it to the compressor, the degasifier operation is preferably effected in the oil collecting sump of the separator itself. The period of time during which the oil remains in the collecting sump has an important influence on the degasifying of the oil. Generally, it can be said that the period of time during which the oil remains within the collecting sump depends on the level of the oil in the collecting sump and on the operating pressure of the separator unit. However, as the oil is fed back to the compressor, the period of time during which the oil remains within the collecting sump can only be increased to a certain limit, and a longer time can only be achieved if the volume of oil flowing in the system is substantially increased. This, however, is undesirous for reasons of economy.

The proportion of gas in suspension in the oil fed back to the compressor has a strong influence on the overall efficiency of the compressor. The sealing effect of the oil in the compressor decreases as a function of the proportion of gas, in suspension in the oil, resulting in a loss of efficiency. In addition, the cooling effect of the oil in the compressor is substantially decreased and if a cooler is installed between the oil-air separator and the compressor, the heat transfer efficiency of the cooler is substantially decreased. Furthermore, measured in flow rate, the volume of oil returned to the compressor is reduced as a function of the volume of air entrained in the oil flow. In addition, the oil can no longer fulfil all the requirements for lubricating the moving parts of the compressor and the sound absorbing capability of the oil in the compressor is accordingly reduced such that the compressor is noisier.

SUMMARY OF THE INVENTION

The principal object of the invention is to provide a degasifier for a liquid, in a liquid phase, which is separated by means of a separator from a gaseous fluid, which achieves an improved degasifying of the liquid circulating in the system, as a result of decreasing considerably the proportion of gas contained in the liquid. The invention provides a degasifying unit which is constructed in such a way as to make it practical for installation more particularly in a gas compressor system. The invention further provides such a degasifyer with a substantally high efficiency without reducing the overall efficiency of the system, even though the volume of liquid circulating in the system is substantially reduced.

A degasifier according to the invention is capable of considerably reducing the proportion of gas contained in a liquid, separated from a gaseous fluid in a separator, in a short time, thus requiring a proportionally shorter time of circulation of the liquid in the system. In this manner, according to the present invention, a larger quantity of gas, for example a larger quantity of air, is removed at a faster rate during the time that the liquid, for example oil, is in the separator itself, such that the oil returned to the compressor contains a greater proportion of oil than hereto available by prior art systems. When utilized in a compressed gas system, the invention permits to obtain the separated liquid, for example oil, in a liquid phase with a substantial overall improvement. Due to the comparatively greater proportion of oil in a liquid phase obtained by the degasifier of the invention, the heat transfer in a cooler connected between the fluid separator and the compressor is increased to the point that the oil temperature can be reduced in the cooler at a much greater rate. This improves greatly the cooling capacity of the oil fed back to the compressor. Simultaneously, due to the greater proportion of oil in the mixture of oil and gas in a liquid phase, there results a greatly increased efficiency of the compressor as the greatly reduced proportion of gas in the oil improves substantially the sealing characteristic of the oil. Furthermore, the compressor is much quieter, which is of particular importance for rotary compressors, as the degasified oil substantially improves the capability of the oil in reducing noise in the compressor.

Further objects and advantages of the present invention will become apparent to those skilled in the art when the following description of examples of the best modes contemplated at the present for practicing the invention is read in conjunction with the drawing wherein like reference numerals refer to like or equivalent parts, and in which:

BRIEF DESCRIPTION OF THE DRAWING

FIG. 1 is a block diagram of a gas compressor system provided with a fluid separator;

FIG. 2 is a schematic longitudinal section of a fluid separator of the conventional type, indicating the present state of the art;

FIG. 3 is a schematic longitudinal section of a fluid separator and liquid degasifier according to the present invention;

DETAILED DESCRIPTION OF THE PREFERRED EMBODIMENTS

Figure 4:
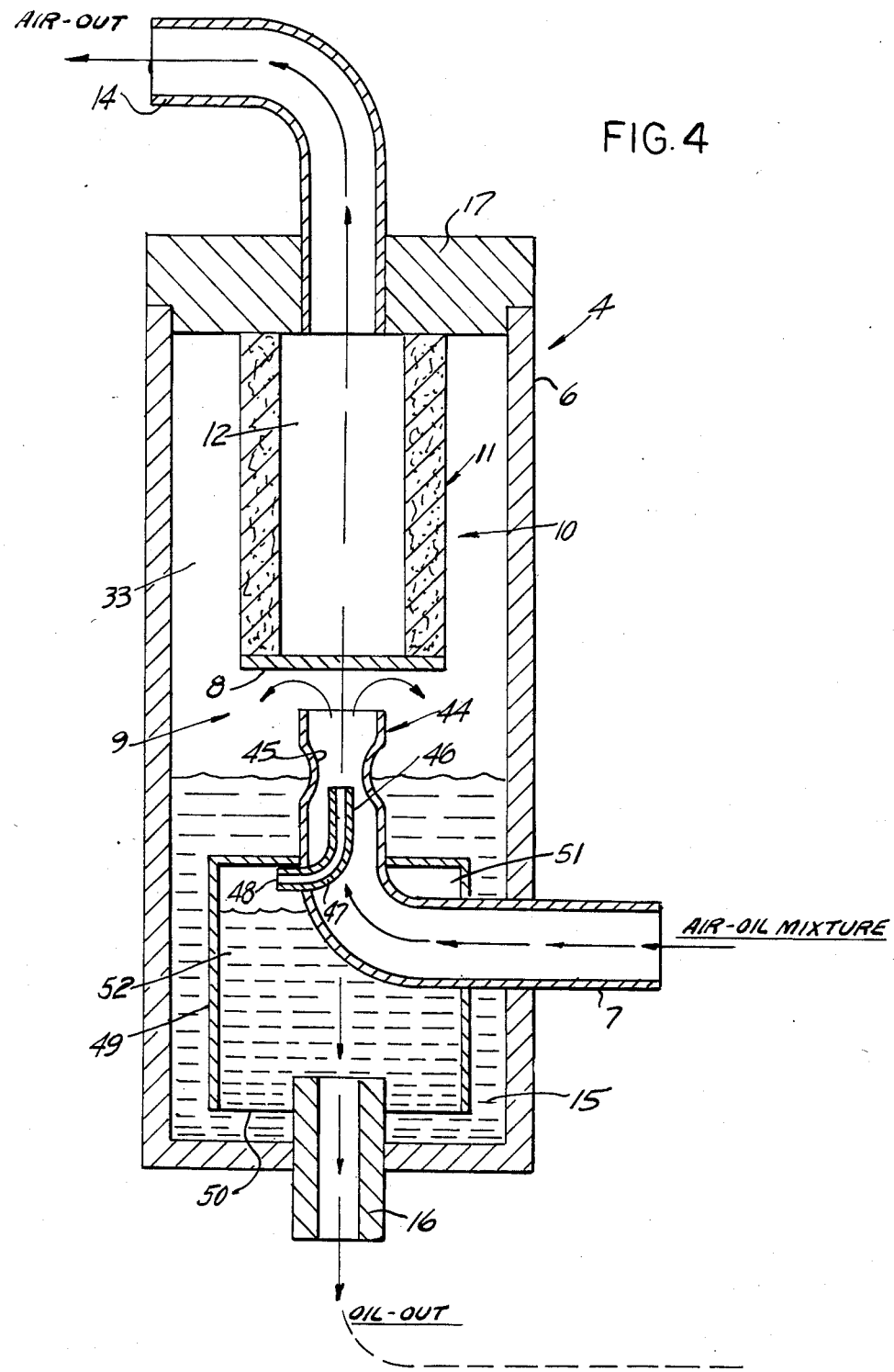
FIG. 4 is a schematic sectional view through a modified separator and degasifier according to the present invention.

Referring to the drawing, and more particularly to FIG. 1, there is illustrated a compressor system for a gaseous fluid, such as atmospheric air for example, although it will be readily apparent that compressor systems for compressing a multiplicity of gases such as, for example, oxygen, nitrogen, hydrogen, helium, etc., or hydrocarbon gaseous fluids such as methane, butane, propane, acetylene, etc., generally take an identical or similar form. In a system for compressing air, atmospheric air is supplied through a filter 1 and an intake regulator 2 to the inlet of a compressor 3, such as a screw compressor for example, in which the air is compressed. The moving parts of the compressor 3 are lubricated and cooled with oil, which is also used for sealing purpose, and as a result oil is added to the compressed air in the form of a fine mist. The gaseous fluid stream from the compressor 3, which contains oil in suspension in the compressed air, is caused to flow through a separator unit, generally designated at 4, in which the oil is separated as a liquid from the compressed air, as well as feasible. The oil separated from the compressed air in the separator 4 is fed back from the oil collecting sump of the separator 4 to the compressor 3 by means of an appropriate return conduit 4', a cooler, not shown, being optionally connected in the return line 4' between the oil collecting sump of the separator 4 and the compressor 3. The compressed air, from which most of the oil has been removed, is then supplied to the consumer through a pressure regulator and one-way valve 5.

An example of structure for a separator 4 is shown in a schematic manner at FIG. 2. The gaseous fluid stream which, in the example of application herein given for illustrative purpose, consists of an air-oil mixture is introduced, in the direction of the arrows, from the compressor 3 (FIG. 1) into the housing 6 of the separator 4 through an inlet 7 in the form of a conduit having its end within the housing 6 disposed proximate a horizontal baffle plate 8 placed in the coarse separation section 9 of the separator housing 6. The baffle plate 8 is installed approximately in the center of the fluid separator housing 6. A fine purification section 10 is disposed at the top of the housing 6 and comprises a cylindrical purifier cartridge 11 made of a porous tubular member or jacket 13 of, for example, molded fabric or the like, surrounding a hollow interior 12. An outlet conduit 14, also disposed approximately in the center of the housing through an end cap 17 closing the top of the housing 6 ducts the processed compressed air from the separator 4, for supplying the compressed air to a user. The outlet 14 is connected to the inside 12 of the purifier cartridge 11. The bottom portion of the separator housing 6 forms a liquid collecting sump 15 in which the separated oil collects. The collected oil is fed back through an outlet 16, at the bottom of the housing 6, to the compressor 3 via the line 4' (FIG. 1).

The arrows in FIG. 2 indicate the fluid flow through the housing 6 through the separator 4. When the fluid stream impinges upon the surface of the baffle plate 8 in the coarse separation section 9, liquid droplets of oil are formed as a result of dynamic condensation or coalescence of the oil mist entrained in the stream of compressed air. The oil droplets drop from the lower edge of the baffle plate 8 into the oil collecting sump 15. When leaving the coarse separation section 9, the gaseous fluid stream is radially diverted by the baffle plate 8 towards the wall of the housing 6 and rises into the fine purification section 10. In the fine purification section 10, the gaseous fluid stream is caused to pass through the wall or jacket 13 of the purifier cartridge 11 to the interior 12 of the cartridge. The oil separated from the gaseous fluid stream in the fine purification portion 10 drops from the outer edge of the baffle plate 8 into the oil collecting sump 15.

FIG. 3 illustrates an example of structure for a fluid separator and degasifier 20 according to the present invention. The separator-degasifier 20 comprises a first cylinder 21, in which the separator coarse separation section 9 is installed and a second cylinder 22, disposed parallel to the first cylinder 21, and in which is disposed the fine purification section 10 comprising the purifier cartridge 11. The upper and lower ends of the two cylinders 21 and 22, which are preferably made of tubular members such as pipes, are in turn connected by cross-channels or conduits 23 and 24. In the outlet portion 25 of the cross-over channel or pipe 23, a fluid distributor or shield 26 is installed in the flow path from the coarse separation section 9 to the fine purification section 10. The fluid distributor 26 may take the form of a half-cylindrical baffle plate which is supported in the cylinder 22 peripherally to and at a predetermined distance from the outer surface 27 of the filter cartridge 11 in the fine purification section 10. The fluid distributor 26 is arranged in such a way that the gaseous fluid stream flowing from the coarse separation section 9 and rising to the top of the cylinder 21 is directed by the cross-over pipe 23 such as to impinge on the wall of the fluid distributor 26. As a result of impinging upon the wall of the fluid distributor 26 a portion of the oil still remaining in the gaseous fluid stream coalesces and drops from the lower edge of the fluid distributor 26 into the oil collecting sump 15, for example through appropriate apertures 28 in the mounting flange 28' of the fluid distributor 26. Furthermore, the fluid distributor 26 accelerates the gaseous fluid stream before it reaches the fine purification section 10, and diverts the gaseous fluid stream away from the condensed oil.

The oil separated from the gaseous stream in the fine purification section 10 also drops into the oil collecting sump 15. The oil separated from the gaseous fluid in the coarse separation section 9 in the cylinder 21, as a result of impingement against the wall 29 of the cylinder 21, flows along the wall 29 into the oil collecting sump 15, while the oil separated from the gaseous fluid stream in the fine purification section 10 and through impingement upon the fluid distributor 26 drops to the bottom of the second cylinder 22 also into the oil collecting sump 15, some of the oil flowing along the inner wall 37 of the cylinder 22. The portion of the oil collecting sump 15 disposed at the bottom of the cylinder 22 is placed in liquid fluid communication with the portion of the oil collecting sump disposed at the bottom of the cylinder 21 through the cross-over bottom pipe 24.

A degasifier unit is provided that comprises a suction portion 30, in the cylinder 21, connected through a conduit 31 to the top of a gas-collecting sump 32 disposed in the cylinder 22 submerged in the oil collecting sump 15. The gas collecting sump 32 takes the form of a bell-shaped vessel 34 which insulates the gas collecting sump 32 from the air space 33 above the level of the oil in the collecting sump 15. The bell-shaped vessel 34 has a diverging open end 35 through which the oil contained in the collecting sump 15 is allowed to rise, a gas space 36 being formed within the dome-shaped top of the bell-shaped vessel 34. The gas space 36 is connected through the conduit 31 to the suction member 30. It will be appreciated that the open end 35 of the bell-shaped vessel 34 diverges towards the wall 37 of the cylinder 22, such as to form a relatively narrow gap 38 between the edge of the diverging open end 35 of the bell-shaped vessel 34 and the wall 37 of the cylinder 22, allowing the oil in the oil collecting sump 15 to pass freely to the interior of the bell-shaped vessel 34. The outlet 16 for the oil is in the form of a tubular member that extends upwardly into the bottom of the bell-shaped vessel 34 through its open end 35 for supplying to the return line 4' mostly oil which has been degasified, as hereinafter explained, from the interior of the bell-shaped vessel 34. The level of the oil in the bell-shaped vessel 34, as indicated at 39, is lower than the level of the oil in the remaining of the oil collecting sump 15, in view of the gas space 36 above the oil level 39.

The suction portion 30, disposed in the cylinder 21, takes the form of a jet pump ejector comprising a tubular member 40 disposed concentrically to the inlet pipe 7 and forming an annular space 41 therewith, the end of the inlet pipe 7 being tapered, as shown at 42, for causing acceleration of the fluid stream through the inlet pipe 7 as it flows into the outlet 43 of the tubular member 40, which causes a drop of relative pressure in the annular space 41. As the annular space 41 is connected to the gas space 36 at the top of the bell-shaped vessel 34, the gas space 36 is continuously vented and the relatively lower pressure existing in the gas space 36 extracts the gas, in the present example air, in suspension in the oil within the bell-shaped vessel 34. The air extracted from the oil within the bell-shaped vessel 34 is thus introduced into the gaseous fluid stream flowing into the cylinder 21 via the inlet conduit 7, the gaseous fluid stream being caused to impinge upon the wall 29 of the cylinder 21 in the coarse separation section 9.

In the structure of FIG. 3, both the suction portion 30 and the gas collecting sump 32 for the oil to be degasified are disposed within the fluid separator 20. As the oil contained within the bell-shaped vessel 32 and drained off the outlet 16 for return to the compressor 3 via the return line 4'(FIG. 1) contains a considerably less proportion of air than would be the case if the oil was fed back to the compressor directly from the oil collecting sump 15, the efficiency, the cooling and the lubrication of the compressor 3 are greatly improved, together with a reduction of the noise of operation of the compressor.

Referring now to FIG. 4, there is illustrated a modification of the invention as applied to the conventional fluid separator shown at FIG. 2. It will, however, be appreciated that the modified structure of the degasifier portion of FIG. 4 can also be incorporated into the separator illustrated at FIG. 3.

The degasifier portion of the structure of FIG. 4, generally shown at 44, comprises a venturi-type tube formed by a restriction 45 formed in the inlet pipe 7 into the coarse separation portion 9 in the separator housing 6. The restriction 45 causes a local acceleration of the gaseous fluid flow in the inlet pipe 7 around an end 46 of a conduit 47, causing a suction effect in the conduit 47, the conduit 47 having its other end 48 disposed within a vessel 49 installed in the oil collecting sump 15 of the separator 4. The vessel 49 is in the form of a cylinder closed at its top and having a bottom open end 50 disposed proximate the bottom of the oil collecting sump 15, into which, preferably, projects the inlet of the sump drain pipe 16. A gas space 51 is formed below the closed top of the cylinder 49, and the air extracted from the volume of oil 52 contained within the vessel 49 and collecting in the gas space 51 is continuously evacuated from the gas space 51 by the conduit 47, at the outlet of which a suction is continuously applied by the venturi-like restriction 45 in the gaseous fluid inlet pipe 7. The result is that the suction exerted on the gas space 51 in the vessel 49 continuously exhausts the gas space 51 and degasifies the oil, in a liquid phase, contained within the vessel 49.

Figure 5:
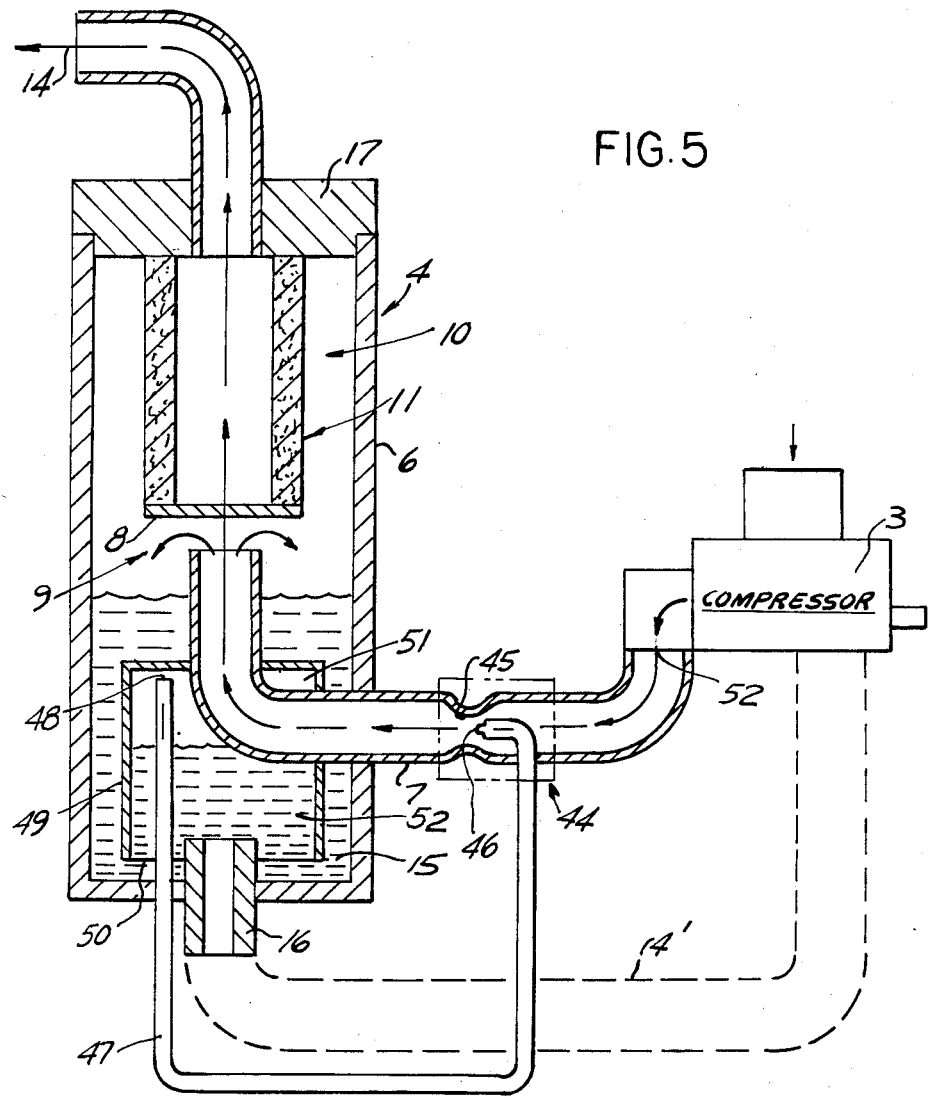
FIG. 5 is a view similar to FIG. 4, but showing a further modification thereof.

FIG. 5 schematically illustrates a modification of the structure of FIG. 4 in which the main difference is that the suction portion 44 of the degasifier is disposed outside of the housing 6 of the separator 4, between the compressor 3 and the separator 4 which, instead of the form specifically illustrated at FIG. 5, may take the form illustrated at FIG. 3. The suction portion 44, which is in the form of a venturi, is connected to the gas space 51, at the top of the vessel 49 by the conduit 47, the conduit 47 having its inlet end 48 disposed proximate the closed top of the vessel 49 in the gas space 51. Preferably, the venturi suction portion 44 is disposed proximate the outlet 52 of the compressor 3 which is connected to the inlet pipe 7 into the separator 4. The resulting advantage is that the flow energy of the compressed air stream at the outlet 52 of the compressor 3 is the highest, as it has not yet been reduced by conduit losses, and therefore the suction on the gas space 51 for extracting the air in the oil within the vessel 49 is the highest possible.

Figure 6:
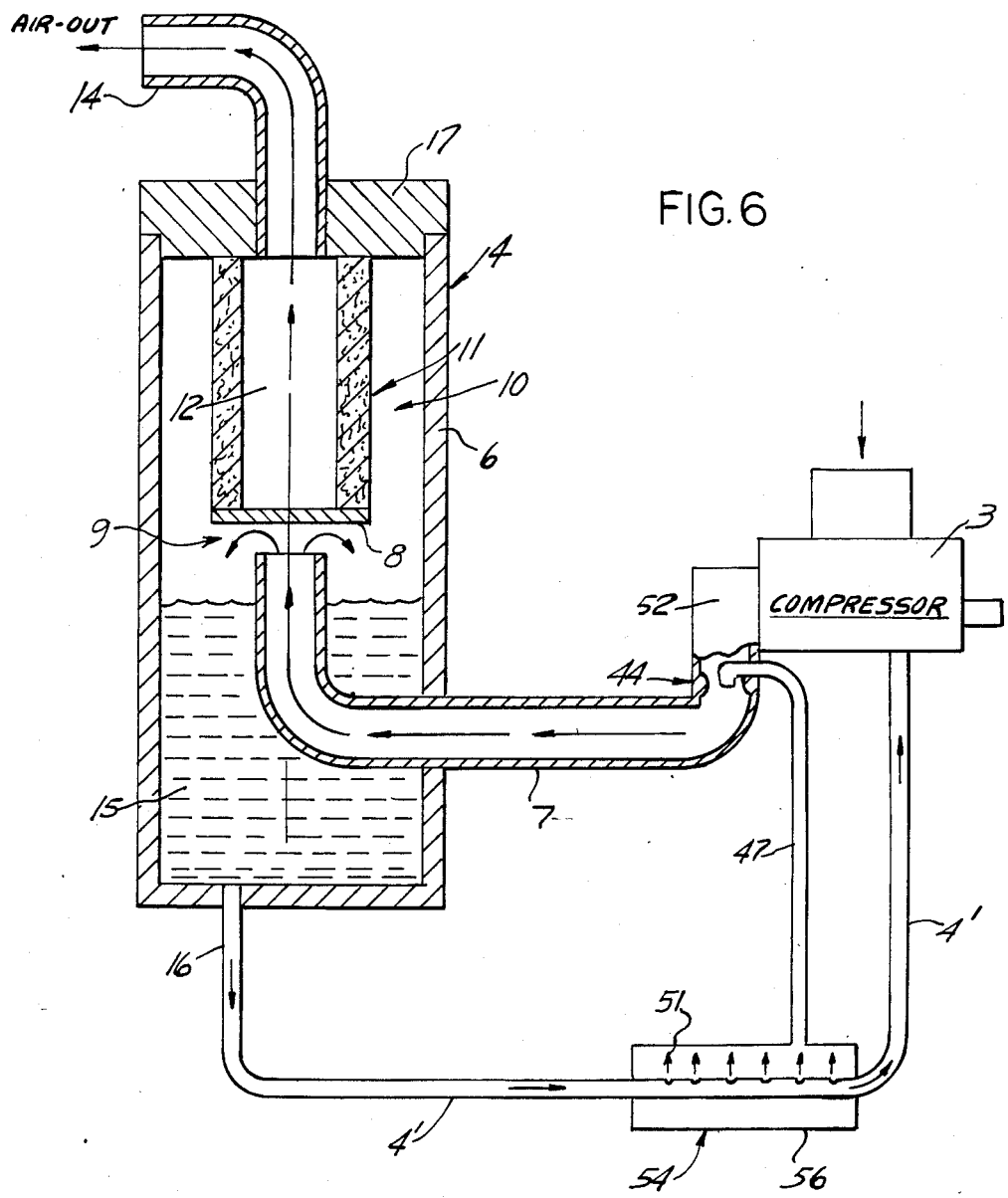
FIG. 6 is a view similar to FIG. 5, but showing a further modification of the invention.

FIG. 6 illustrates, in a schematic manner, a further modification of the invention wherein the degasifier unit, generally designated at 54, is disposed outside the separator 4 in the return line 4' returning the oil to the compressor 3 from the outlet 16 of the oil collecting sump 15 at the bottom of the separator housing 6. Preferably, the degasifier 54 is located as close as possible to the compressor 3. The suction portion 44 of the degasifier, which may take the form of a venturi-type member, is located preferably at the outlet 52 of the compressor 3 and is connected by the conduit 47 to the gas space 51 on the top of the degasifier 54 which may take the form of a tubular vessel 56 in the return pipe 4'. The degasifier 54 may be combined with a cooler, or acts as a cooler, for the oil being returned to the compressor 3.

Having thus described the present invention, by way of examples of structure well designed for accomplishing the objects of the invention, modification whereof will be apparent to those skilled in the art, what is claimed as new is as follows:

1. In a gaseous fluid compression system comprising a compressor for compressing said gaseous fluid wherein oil is mixed with said gaseous fluid during compression thereof, said compressor having an outlet connected to a gas/liquid separator through which the compressed gaseous fluid is passed for separating the oil from said gaseous fluid wherein the separated oil falls by gravity in an oil collecting sump at the bottom of the separator, and conduit means returning the oil separated from said gaseous fluid to the compressor, a degasifier for removing gaseous fluid still contained in the oil in the collecting sump of said separator, said degasifier comprising a vessel, means for supplying the interior of said vessel with the oil in the collecting sump to a level, a collection chamber disposed in said vessel above the level of oil in said vessel, and a conduit having an inlet in said collection chamber for placing said collection chamber in communication with a source of reduced pressure for drawing gaseous fluid from said oil and for evacuating said gaseous fluid drawn in said collection chamber, wherein said conduit means returning the oil to the compressor returns substantially degasified oil from said vessel to the compressor.

2. The degasifier of claim 1 wherein said vessel is disposed in said oil collecting sump below the level of oil in said oil collecting sump.

3. The degasifier of claim 1 wherein said vessel is disposed in series in said conduit means returning the oil from said oil collecting sump to the compressor.

4. The degasifier of claim 1 wherein said source of reduced pressure is a jet pump ejector at the outlet of said conduit, said jet pump ejector being disposed in the outlet of said compressor.

5. The degasifier of claim 1 wherein said source of reduced pressure is a venturi-type tube at the outlet of said conduit, said venturi-type tube being disposed in the outlet of said compressor.

6. The degasifier of claim 1 wherein said source of reduced pressure is a jet pump ejector at the outlet of said conduit, said jet pump ejector being disposed in the inlet to said separator.

7. The degasifier of claim 1 wherein said source of reduced pressure is a venturi-type tube at the outlet of said conduit, said venturi-type ejector being disposed in the inlet to said separator.

8. In a gaseous fluid compression system comprising a compressor for compressing said gaseous fluid wherein oil is mixed with said gaseous fluid during compression thereof, said compressor having an outlet connected to a gas/liquid separator through which the compressed gaseous fluid is passed for separating the oil from said gaseous fluid wherein the separated oil falls by gravity in an oil collecting sump at the bottom of the separator, and conduit means for returning the oil separated from said gaseous fluid to the compressor, a degasifier for removing gaseous fluid in suspension in the oil in the oil collecting sump of said separator, said degasifier comprising a vessel having a closed top and an open bottom, said vessel being disposed in said collecting sump below the level of oil in said sump, whereby said vessel is partially filled with the oil in said sump and a collection chamber is defined in said vessel below the closed top thereof, and a conduit having an inlet in said collection chamber for placing said collection chamber in communication with a source of reduced pressure for drawing gaseous fluid from said oil into said collection chamber and for evacuating said drawn gaseous fluid from said collection chamber wherein said conduit means returning the oil to the compressor has an inlet in said vessel for returning substantially degasified oil to said compressor.

9. The degasifier of claim 8 wherein said source of reduced pressure is a jet pump ejector at the outlet of said conduit, said jet pump ejector being disposed in the inlet to said separator.

10. The degasifier of claim 8 wherein said source of reduced pressure is a venturi-type tube at the outlet of said conduit, said venturi-type ejector being disposed in the inlet to said separator.

11. The degasifier of claim 8 wherein said source of reduced pressure is a jet pump ejector at the outlet of said conduit, said jet pump ejector being disposed in the outlet of said compressor.

12. The degasifier of claim 8 wherein said source of reduced pressure is a venturi-type tube at the outlet of said conduit, said venturi-type tube being disposed in the outlet of said compressor.

* * * * *